No. 41,319.  PATENTED JAN. 19, 1864.
D. POLLOCK.
FEED WATER HEATER FOR LOCOMOTIVES.
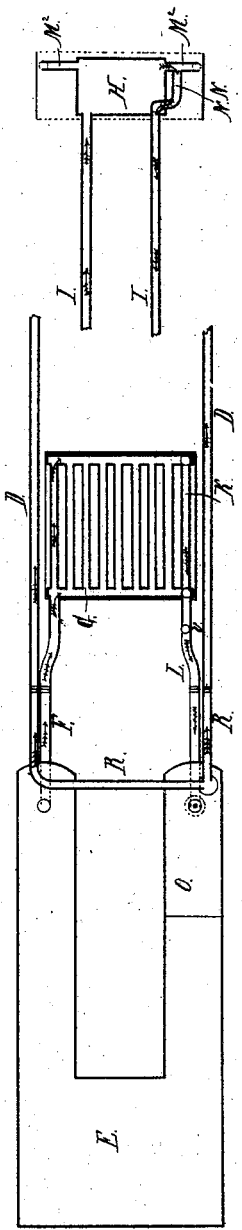
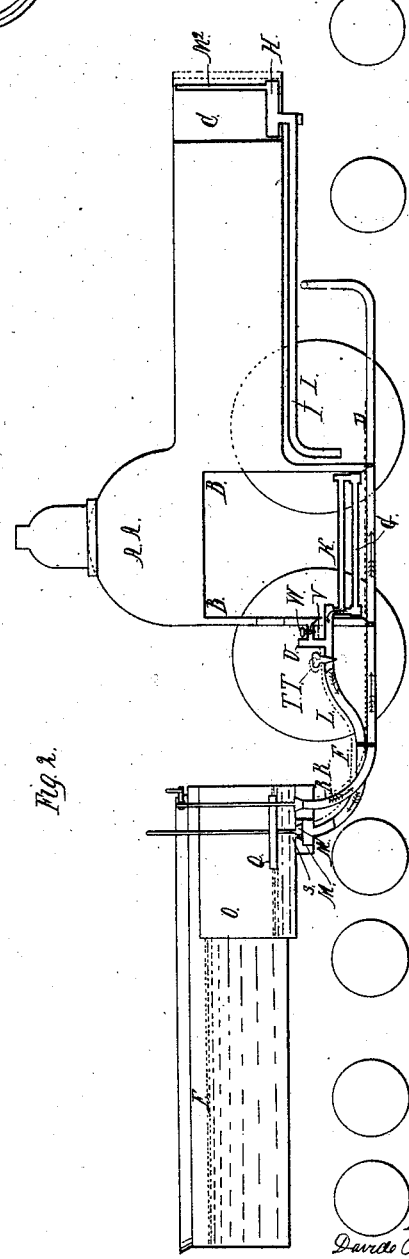

UNITED STATES PATENT OFFICE.

DAVID POLLOCK, OF LANCASTER, PENNSYLVANIA.

IMPROVED FEED-WATER HEATER FOR LOCOMOTIVES.

Specification forming part of Letters Patent No. 41,319, dated January 19, 1864; antedated January 17, 1864.

*To all whom it may concern:*

Be it known that I, DAVID POLLOCK, of Lancaster, in the county of Lancaster and State of Pennsylvania, have invented a certain new and useful Improvement in Steam-Engines, for the purpose of heating and circulating the feed-water contained in the tank or cistern for supplying steam-boilers with heated water; and I do hereby declare that the following is a full and exact description of the same, reference being had to the accompanying drawings, forming a part of this specification, in which—

Figure 1 is a plan view of the construction of my invention. Fig. 2 is a vertical longitudinal section. Fig. 3 is a vertical transverse section.

Similar letters of reference indicate corresponding parts in the different figures.

The invention consists in certain provisions being made for heating and circulating the feed-water contained in the tank or cistern and conducting it through the heaters and returning the water after being heated to the tank or to a separate chamber provided for it, from which the heated water is drawn for supplying the steam-boiler.

A A represents the steam-boiler, which may be constructed in the usual manner or form; B B, the fire-box; C C, the smoke-box; D D, the boiler supply-pipes; E E, the tank or cistern, which contains the feed-water for supplying the steam-boiler; F F, the pipe or hose, which conducts the water from the tank to the heater G G in the fire-box and to the heater H H in the smoke-box. The said heaters in the fire-box and smoke-box may be connected together by extending the pipes I I of the smoke-box heater back to the fire-box, and connecting them to the fire-box heaters G G, when the water in the tank or cistern will be circulated through both heaters; or either one of the heaters may be used separately and independent of the other for heating the water contained in the tank or cistern for supplying the steam-boiler.

The heater G G in the fire-box is constructed of tubular bars or pipes, but not connected with the water-space in the fire-box or boiler, through which the water from the tank circulates, these tubular bars or pipes serving at the same time for the fire-grates, extending above at one side of the heater G G, and connected to it at one or more places. The tubular pipes K K are arranged either horizontally or vertically, for the purpose of increasing the heat of the water and expanding it more in that part or side of the heater than the water in the opposite side, thus making the water in that part of the heater lighter, so that it will pass off freely through the pipe L L to the tank or to a separate chamber.

The heater H H in the smoke-box is constructed of one or more plain chambers, as shown, of any suitable size, placed at the bottom of the inside of the smoke-box, having one or more circular pipes, $M^2 M^2$, attached, as shown, and curved around to suit the radius of the smoke box. These circular pipes are for the purpose of admitting the steam to rise above the water contained in the lower part of the heater, for the purpose of the steam giving additional heat to the water within the heater, and serving to keep the smoke-box cool. At one side of this heater and at the front end the pipe N N is attached, as shown, for the purpose of reheating the water to make it lighter at that side of the heater, so that it will discharge more freely for supplying the tank or chamber with heated water for the steam boiler.

Within the tank E E are arranged one or more circulating chambers, as shown at O O, or the said chambers may be arranged separate from the tank. This chamber is for the purpose of circulating the water contained in the tanks through the heaters, the height or level of the water in the chamber O O being regulated by the valve M, and operated by the attached float Q, the height of water in this chamber being kept below the height or level of the water in the tank, the water being drawn off by the pumps from the chamber O O through the pipes or hose R R for the supply of the steam-boiler. By this means a constant circulation of the water through the pipes and heaters is maintained. In the float-valve M there is a suitable opening, as shown at S, for the purpose of allowing the heated water to rise up through the pipe L L into the chamber when the valve M is closed against its seat.

T T are stop cocks in the pipes, to confine the water in the heaters when the tank is separated from the boiler. U is a safety-valve connected to the heater in the fire-box, and is for the purpose of discharging steam from the heaters when required. V is a pipe connecting the heaters to the water-space of the steam-boiler, for the purpose of filling the heater with water when the tank and boiler are separated.

W is a stop for shutting the communication between the heater and water-space of the boiler when the tank and boiler are connected together.

I am aware of water-heaters being used in furnaces or fire-boxes of steam-boilers, constructed in different forms, and being connected to the water-space of the steam-boiler, the water thus circulating equally through the heater and boiler.

I am also aware of the water-feed pipes being attached to heaters, and pumping the water into the heaters for supplying the boiler, these heaters being for the purpose of assisting to generate steam in connection with the boiler.

I am also aware of heaters being used in a variety of shapes in and around the smoke-box and stack of steam-boilers, the water being pumped into these heaters for supplying the boilers.

I am also aware of the feed-water in the tank being pumped through heaters in and around the smoke-box and stack and back to the tank for supplying the steam-boiler.

I am aware, also, of the float-valves being used for the purpose of regulating the head and fall of water.

These I do not claim.

What I claim as my invention, and desire to secure by Letters Patent, is—

1. One or more circulating-chambers, in combination with the tank and heaters, substantially as and for the purpose set forth.

2. The tubular bars or grates G G in the furnace or fire-box, in combination with one or more circulating chambers for heating the feed-water, substantially as set forth.

3. One or more pipes, K K, attached to the fire-grate heater, and extending above the grate, as herein described, for the purpose set forth.

4. The valve M with the float Q attached, in combination with the circulating-chamber, tank, and heaters, substantially as and for the purpose herein described.

5. The pipe V with the stop W, arranged as shown, for the purpose specified.

6. Combining, with the heater G G in the fire-box, the safety-valve U, for the purpose herein set forth.

7. The heater H H in the smoke-box, constructed with the circular pipes, substantially as shown and described.

8. The reheating-pipe N N, constructed as and for the purpose specified.

9. The hose or pipes F and L, in combination with the tank, heaters, and circulating-chamber, as and for the purpose described.

DAVID POLLOCK.

Witnesses:
JACOB STAUFFER,
J. R. POLLOCK.